United States Patent [19]

Inskeep et al.

[11] Patent Number: 4,742,482
[45] Date of Patent: May 3, 1988

[54] MODEM CONTROLLER

[75] Inventors: Jeffrey Inskeep, Roswell; George R. Thomas, Marietta, both of Ga.

[73] Assignee: Hayes Microcomputer Products, Inc., Norcross, Ga.

[21] Appl. No.: 792,520

[22] Filed: Oct. 29, 1985

[51] Int. Cl.⁴ .................. G06F 11/00; G06F 13/00
[52] U.S. Cl. ........................... 364/900; 371/66; 375/8; 365/228; 340/825.16
[58] Field of Search .................. 371/66; 364/200 MS File, 900 MS File; 340/825.16; 375/8; 365/228

[56] References Cited

U.S. PATENT DOCUMENTS

| | | | |
|---|---|---|---|
| 3,916,390 | 10/1975 | Chang et al. | 365/228 |
| 3,937,937 | 2/1976 | McVey | 235/153 R |
| 4,015,206 | 3/1977 | Huntley | 340/825.16 |
| 4,087,855 | 5/1978 | Bennett et al. | 364/200 |
| 4,306,299 | 12/1981 | Check, Jr. et al. | 364/900 |
| 4,307,455 | 12/1981 | Juhasz et al. | 364/900 |
| 4,327,410 | 4/1982 | Patel et al. | 364/200 |
| 4,458,307 | 7/1984 | McAnlis et al. | 364/200 |
| 4,525,800 | 6/1985 | Hamerla | 364/900 |
| 4,591,782 | 5/1986 | Bermer | 324/103 R |

FOREIGN PATENT DOCUMENTS

2120907A 12/1983 United Kingdom .

Primary Examiner—Gary V. Harkcom
Assistant Examiner—Randy W. Lacasse
Attorney, Agent, or Firm—Jones, Askew & Lunsford

[57] ABSTRACT

A memory (90) comprising a non-volatile memory and a volatile memory, contains a test word and other words which represent a complete user-selected configuration profile. The configuration profile is stored in the memory (90) by a microprocessor (36) automatically when power is interrupted. A second power supply (80) provides operating power to the memory (90) so that the memory (90) can complete its storage cycle even after primary power has failed. The microprocessor (36) checks memory (90) for the test word to verify that the memory (90) has been programmed with a configuration profile and is not missing or defective. The modem (12) resets when power is first applied and when the power supply (75) noise exceeds a predetermined safe level. A concealed jumper strap (61) allows for the reversible placement of the modem (12) into a "dumb" mode wherein the configuration profile cannot be altered.

28 Claims, 1 Drawing Sheet

MODEM CONTROLLER

TECHNICAL FIELD

The present invention relates to the control and operation of modems and particularly discloses an improved modem controller which allows all configuration parameters to be selected by using an asynchronous data terminal rather than switches, and provides switching and storing of operating parameters in response to various inputs, including fluctuations in power supply input voltage.

BACKGROUND OF THE INVENTION

The rapid growth in the use of digital computing machines created a need for a data communications device which would enable digital computing machines to communicate with each other over standard voice-grade telephone lines. The answer to this need came in the form of a data modulator-demodulator device, commonly called a modem.

Modems are frequently required to be able to accommodate a variety of modulation schemes, bit rates, and data formats, and to operate in either a half-duplex or full-duplex mode. Also, many modern intelligent modems provide automatic answering of incoming calls, and both dual tone multiple frequency ("tone dialing") and rotary pulse dialing of user-selected telephone numbers. These modulation schemes, bit rates, data formats, and other features are often referred to as operating parameters. A particular combination of operating parameters may be conveniently referred to as a configuration profile.

A typical modem will have a read only memory (ROM) with a factory setting of some of the operating parameters, commonly called default settings, but not a complete configuration profile. A ROM is programmed by the manufacturer and "remembers" the default settings even when power is turned off for an extended time. The remainder of the operating parameters are set by using internal and external switches. The internal switches are usually not easily accessible. The typical modem will also allow the user, by using his data terminal, to override the default settings and command the modem to use another partial set of operating parameters, commonly called active parameters, which are stored in a volatile memory. A volatile memory will "forget" its contents if the power is turned off. Therefore, some modems have a battery which provides power to the memory for a short time in the event that the main power is turned off. The remainder of the operating parameters are again set by the same internal and external switches.

Neither the ROM nor the volatile memory stores a complete configuration profile. The operating parameters normally set by internal switches are ones which are unlikely to change often and/or are determined by the other equipment with which the modem is used. Some of the operating parameters which are typically set by internal switches are: whether the modem responds to the data terminal ready signal; whether the modem sends result and error codes as English words, numbers, or not at all; whether or not the modem echoes the data back to the data terminal; whether or not the modem will answer an incoming call; whether or not the modem will advise the dta terminal if the carrier is present on the telephone line; what type of telephone circuit the modem is connected to; and whether the modem is in an intelligent or dumb mode.

Some of the operating parameters which are typically set by external switches are: manual reset of the modem; high speed or low speed communications; self-test of the modem-to-telephone line interface circuits; testing of the device connected to the other end of the telephone line.

Some of the operating parameters which are typically stored in the read only memory as factory default settingg are: a modem operating speed of 0-300, 600, 1200 or 2400 bits per second; 7 or 8 bits per character; odd, even, or no parity; number of stop bits per character; selection of automatic answer; the number of rings before the modem will pick up the telephone line; tone or pulse dialing; whether or not a line feed signal is sent after a carriage return signal; how long the modem waits for a dial tone before dialing a desired telephone number; how long the modem will wait for a carrier signal after it has dialed the telephone number; whether or not, and how long, to pause during dialing; how long the modem will wait after the carrier disappears before it hangs up the telephone line; speaker volume; and other options.

In many modems, many of these operating parameters can be temporarily changed by commands from the data terminal. Assume that a modem could store a complete configuration profile in the ROM and also in the volatile memory. Also assume that a user has stored a desired configuration profile in the volatile memory. If the AC power is removed for an extended time, the battery backup will fail. Also, batteries have a limited lifetime and will permanently fail after some period of time. If the AC power is removed for an extended time, or if the battery backup has failed from aging and the AC power is removed for any period of time, the volatile memory will fail and the user's desired configuration profile will be lost.

The default setting in the ROM would still exist, but the user may have to make numerous program and switch setting changes on his data terminal, which may be a computer, in order to match the default settings so that the data terminal and the modem can communicate. The user would then command the modem to change its operating parameters from the default setting to the desired operating parameters. However, the data terminal is now set for the default settings and the modem is set for the desired operating parameters. Since the parameters are different, the data terminal and the modem cannot communicate. The user must therefore now reverse the numerous program and switch setting changes on his data terminal to change it back to the desired operating parameters so that the data terminal and the modem can communicate. This is clearly a time-consuming and tedious procedure.

A typical modem therefore suffers from two disadvantages: some of the operating parameters are selected by using switches, some of which are not conveniently accessible; and the programmable operating parameters which are stored in a volatile memory will be lost if the battery backup fails or if the AC power is removed for an extended period of time. There is therefore a need for a modem which allows a configuration profile to be programmed using only a data terminal and without using any switches, and which stores a configuration profile in a programmable memory which is nonvolatile and therefore does not forget the configuration profile when power is removed, even for an extended time.

A modern intelligent modem is a digital computing machine, containing a microprocessor which controls many operations, and is therefore, to some degree, sensitive to voltage fluctuations on the output of the modem power supply. A transient on the AC power line which is severe enough to affect the output of the modem power supply may disrupt the orderly operation of the microprocessor, thereby causing the modem to generate erroneous data, to change the configuration profile, to become locked up (unresponsive to commands), or to cease operation. There is therefore a need for a modem which will respond in a predictable manner to transients which are severe enough to adversely affect its operation.

A modem is also a data communications device. Therefore, one port of a modem is connected to a telephone line and the other port is connected to a data terminal, typically by an RS-232C cable in a length suited to meet the particular user's equipment placement. The telephone line and the RS-232C cable act as antennas and couple electrical noise into the modem. A modem will have some filtering to prevent this noise from being coupled to the internal modem wiring, but a particularly intense burst of noise may overwhelm the filters. This is frequently the case with a discharge of static electricity. In such a case the orderly operation of the microprocessor and/or other sensitive components may be disrupted, thereby causing the modem to generate erroneous data, to change the configuration profile, to become locked up (unresponsive to commands), or to cease operation.

A typical manner of correcting such problems is to turn off the AC power to the modem, wait until the modem power supply has discharged, and then turn the AC poewr on again. This is a time-consuming procedure, especially if the modem reverts to the default setting if power is turned off. Also, in some installations, such as modems installed in computer peripheral expansion slots, there is no convenient manner of turning off the AC power to the modem. In the event of lockup for these modems, the entire computer must be turned off to allow the system to recover. There is therefore a need for a modem which will respond to a particular signal even in cases where the modem is locked up and otherwise unresponsive to commands issued by the data terminal.

A modern intelligent synchronous and asynchronous modem operates in one of three modes; a synchronous communications mode in which the modem acts as a data communications device; an asynchronous on-line communications mode in which the modem again acts as a data communications device; and an asynchronous command mode in which the modem interprets data from the data terminal as commands to the modem.

While the modem is in the asynchronous command mode the user uses the data terminal or computer to select the operating parameters, perform call set up functions such as dialing, answering, etc., and to select one of the two communication modes. Thereafter, the operation of the modem is controlled by the data terminal. A typical method of allowing the data terminal to control the modem operation is by using the data terminal ready (DTR) signal from the data terminal. If the DTR signal is active (true), the data terminal is either sending data to the modem for the modem to transmit over the telephone line, or is accepting data from the modem which the modem has received over the telephone line. If the DTR signal is inactive (false), the data terminal is sending a command to the modem. Other appropriate signals from the data terminal may also be used for this purpose.

If the DTR signal is used, then if the data terminal ready (DTR) signal is inactive, the modem responds by going into the asynchronous command state. If the DTR signal is active, the modem reponds by switching to the user-selected first or second mode, acts as a data communications device, and is otherwise unresponsive to commands from the data terminal.

However, in some applications the data terminal may erroneously transmit data at a time when the DTR signal is inactive. When this occurs, the modem interprets the data as a command. If the data corresponds to a command to change the operating parameters the modem may be forced into a state in which it can no longer communicate with the data terminal or computer to which it is attached until the correct operating parameters are reprogrammed. This can be time-consuming and can be a major problem if the modem is used in a commercial environment where the data terminal operator is not trained or equipped to program modems. Therefore, a service technician may have to be called to reprogram the proper operating parameters into the modem.

A typical method of preventing this from happening is to have a switch which prevents the modem from responding to any program commands from the data terminal. This switch is often called a "dumb mode" switch. However, switches are subject to contact corrosion and to being changed inadvertently.

Furthermore, it is not desirable to be able to place the modem in the dumb mode by a program command from the data terminal since, once the command is given, the modem will ignore all further commands, including a command to exit from the dumb mode. The modem would therefore be permanently locked in the dumb mode and it would be impossible to make any necessary changes in the operating parameters in the future unless it will exit the dumb mode when the power is turned off.

There is therefore a need for a modem which has a provision for placing the modem into the dumb mode without using switches which may be inadvertently changed.

SUMMARY OF THE PRESENT INVENTION

The present invention provides an improved modem controller which fulfills the above cited needs and overcomes the problems and limitations described above.

Broadly stated, the present invention provides a microprocessor control for a modem which allows a user to program a complete configuration profile using only an asynchronous data terminal and without setting any switches, provides for the automatic or selectable storage in a nonvolatile memory of a complete, user-selected configuration profile to be used as the power up default, or primary, configuration profile in lieu of the factory-set default configuration profile. It further allows the user to program and use a complete active configuration profile which may be different than the factory-set default configuration profile or the user-selected, stored configuration profile.

Also broadly stated, the present invention provides a microprocessor control for a modem which resets the modem to a known configuration profile and operating mode by resetting the microprocessor, automatically whenever there is a severe transient on the AC power line, and also upon a user-initiated negative transition of the data terminal ready signal, even in cases when electrical noise, static, or other events would cause a prior art modem to become locked up and otherwise unresponsive to commands from the data terminal.

Also broadly stated, the present invention provides a microprocessor control for a modem which allows the user to reversibly place the modem into the dumb mode in a manner which is highly resistant to inadvertent or wrongful attempts to remove the modem from the dumb mode, and which also prevents data terminal errors from changing the operating parameters of the modem.

More particularly described, the present invention uses a microprocessor to store a user-selected set of operating parameters, that is—a complete configuration profile, in a nonvolatile memory, thereby eliminating the need for internal and external switches to set the operating parameters. Using a standard asynchronous data terminal, the user sends a complete set of the desired operating parameters to the microprocessor. The microprocessor stores these operating parameters in its internal registers. If the user deems the selected configuration profile to be worthy of saving, he then commands the microprocessor to store the configuration profile into the volatile memory. Then, if the AC power fails, the configuration profile will be automatically transferred from the volatile memory to the nonvolatile memory, where it is permanently stored.

The user therefore has three complete configuration profiles at his disposal: the factory set default configuration profile, the configuration profile which he has stored in the nonvolatile memory, and an active configuration which may be either of the above configuration profiles, or a new configuration profile which he sets using his data terminal.

Also more particularly described, the present invention provides for the automatic testing of the nonvolatile memory and provides for the automatic recall of the complete configuration profile from the nonvolatile memory if the nonvolatile memory passes the test, and for the automatic recall of the factory set default configuration profile if the nonvolatile memory fails the test.

Also more particularly described, the present invention uses electronic components other than the microprocessor to monitor the voltage fluctuations on the modem power supply and, if selected by the user, to monitor the state of a particular signal from the data terminal. If the voltage fluctuations on the modem power supply exceed a predetermined safe level, or if the particular signal changes to a particular state, then the electronic components will automatically reset the microprocessor and other modem circuits to a user-selected state. This allows the user to easily regain control of the modem, without shutting off its power, in the presence of AC power fluctuations, electrical noise, or a static discharge which would cause a prior art modem to operate improperly or lock up.

Also more particularly described, the present invention uses a movable internal jumper wire to selectively connect two contacts to instruct the microprocessor as to whether the modem should be in the dumb mode. The microprocessor determines the placement of the jumper wire when power is turned on, and also when a configuration profile stored in the nonvolatile memory is recalled for use as the active configuration profile.

Thus, it is an object of the present invention to provide a modem which allows the user to specify all the operating parameters of a configuration profile without having to set any switches on the modem.

It is a further object of the present invention to provide a modem which has an improved nonvolatile memory for storing a configuration profile.

It is a further object of the present invention to provide a modem which automatically stores the configuration profile into the nonvolatile memory if power fails.

It is a further object of the present invention to provide a modem which automatically tests the nonvolatile memory by looking for a predetermined bit pattern.

It is a further object of the present invention to provide a modem which preferably recalls the configuration profile from the nonvolatile memory, and alternatively recalls a factory set default configuration profile from a read only memory during power up.

It is also an object of the present invention to provide a modem which automatically resets to a known operating state by resetting the microprocessor whenever there are excessive voltage fluctuations on the modem power supply.

It is also an object of the present invention to provide a modem which allows the user to regain control of a malfunctioning modem by changing the state of a particular signal from the data terminal, thereby resetting the microprocessor.

It is also an object of the present invention to provide a modem which is unresponsive to an erroneous data transmission when a particular signal from the data terminal is in a state which would cause prior art modems to respond to such erroneous data.

It is also an object of the present invention to provide a modem which is resistant to inadvertent and unauthorized attempts to change the mode of operation of the modem.

BRIEF DESCRIPTION OF THE DRAWING

The drawing FIGURE is a schematic diagram of the preferred embodiment of the present invention.

DETAILED DESCRIPTION

Figure 1:
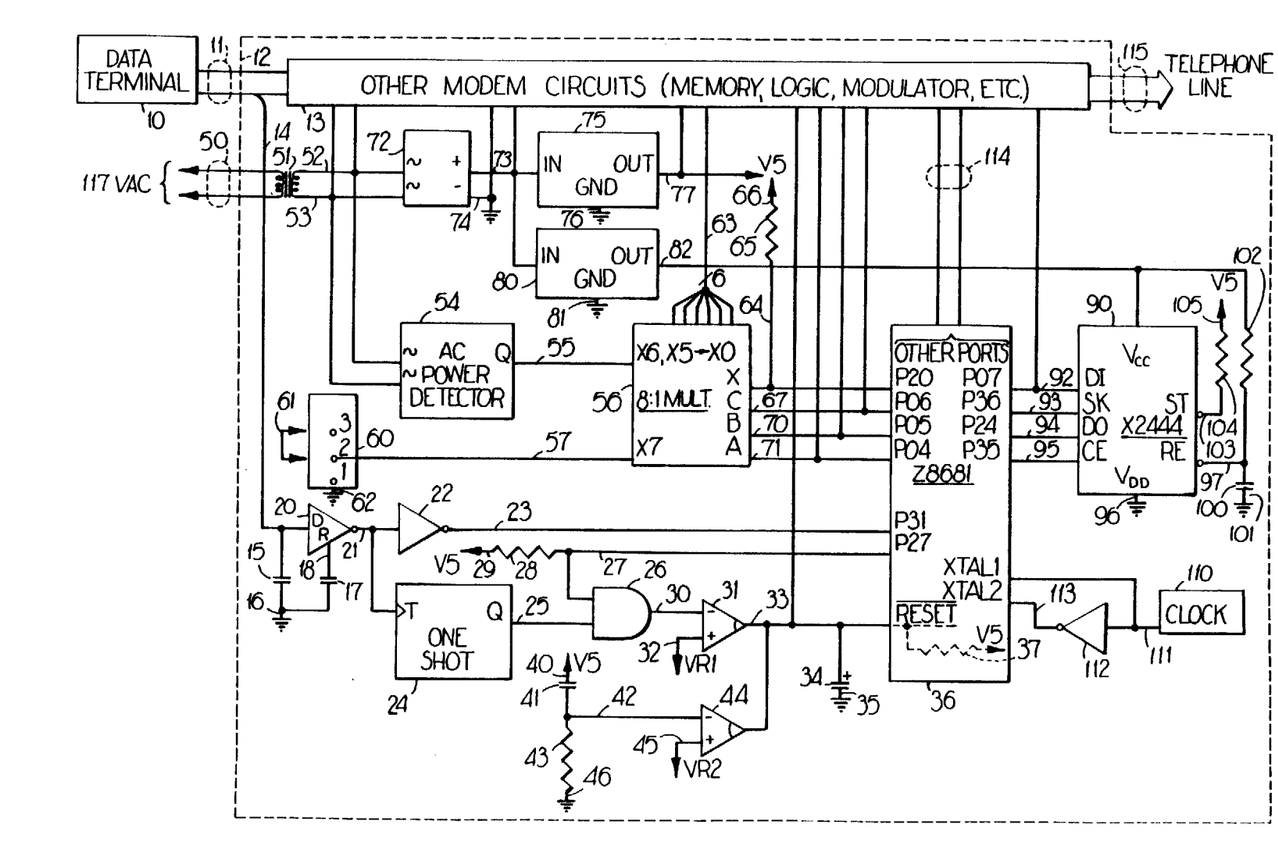

Turning to the drawing, the preferred embodiment of the present invention will now be described. The FIGURE is a schematic diagram of the present invention in a modem.

The preferred embodiment is included in a modem 12 constructed around a microprocessor 36. In the preferred embodiment microprocessor 36 is the Z8681, which is the eight megahertz version of the Z8 microprocessor. Details of the operation and internal structure of the microprocessor 36 are available in the literature supplied by the manufacturer, Zilog, Inc. of Cupertino, Calif. Microprocessor 36 interfaces with other devices through four eight-bit ports designated by the manufacturer as ports 0 through 3. This port notation, along with the bit number, is used in the FIGURE to specify a particular terminal of microprocessor 36. For example, the designation P20 refers to port number 2, bit number 0.

Before beginning the detailed description of the present invention the environment of the preferred embodiment will be described. An external data terminal 10, which may be a digital computing machine or some other digital device, communicates with and is connected to the modem 12 by an RS-232C interface 11. The modem 12 is also connected to a subscriber telephone line 115 so that data may be exchanged with some remote device. It will be appreciated that the number of conductors in telephone line 115 will be two or more, depending upon the particular user's telephone system. The modem 12 converts data from an RS-232C format to a format suitable for transmission over a telephone line 115, and vice versa.

Inside the modem 12, the RS-232C bus 11 and the telephone line 115 are connected to the other modem circuits 13. It will be appreciated that the other modem circuits 13 comprise, for example, signal input and output conditioning and isolation circuits, voltage regulators and filters, phase locked loops, modulators, demodulators, status indicators, frequency synthesizers, and a read only memory (ROM) which contains the factory default settings and also the operating instructions for microprocessor 36.

Microprocessor 36, hereinafter called processor 36, communicates with and controls the other modem circuits 13 by conductors 67, 70, 71, 92, a six conductor bus 63, and multiconductor bus 114. The number of conductors in bus 114 will necessarily depend on how many of the other ports of processor 36 are required to implement the desired modem functions. Exemplary details of how other functions of a modem may be controlled by a microprocessor such as processor 36 may be found in U.S. Pat. Nos. 4,431,867 and 4,504,802 which are assigned to the assignee of the present invention.

The processor 36 is driven by a 7.9872 MHz clock 110 which is connected by conductor 111 to the XTAL1 terminal of processor 36 and to the input of an inverter 112. The output of the inverter 112 is connected by conductor 113 to the XTAL2 terminal of processor 36.

At this point a discussion of the function of the data terminal ready (DTR) signal is appropriate. The RS-232C bus 11 contains among other conductors, a DTR conductor 14. A data terminal 10 will place a "true" or active signal on DTR conductor 14 when the data terminal is ready to exchange data over telephone line 115 via modem 12. If the DTR signal is "false" or inactive then the data terminal 10 is not ready to exchange data but may, if the data terminal 10 has asynchronous operation capability, be ready to issue commands to the modem 12. The response of the modem 12 to the DTR signal is programmed by the user from asynchronous data terminal 10. Methods of accomplishing this are well known.

If the data terminal 10 is a synchronous data terminal a false-to-true transition of the DTR signal may instruct the modem 12 to go off-hook, dial a telephone number, and then enter the synchronous mode. The modem 12 will then be unresponsive to commands and will function as a data communications device which transfers data between the data terminal 10 and the telephone line 115.

A true-to-false transition of the DTR signal may then instruct the modem to go on-hook and enter the asynchronous command mode. As is explained below, the present invention also permits a true-to-false transition of the DTR signal to instruct the modem 12 to enter the "dumb" asynchronous mode wherein the modem 12 is unresponsive to commands from the data terminal.

If the data terminal 10 is an asynchronous data terminal then a false-to-true transition of the DTR signal, occurring subsequent to a dial command sent from the data terminal 10, instructs the modem 12 to complete the telephone connection and enter the asynchronous data mode. The mode 12 will then be unresponsive to commands and will function as a data communications device which transfers data between the data terminal 10 and the telephone line 115. The true-to-false transition of the DTR signal may then instruct the modem 12 to go on-hook and change from the asynchronous on-line data transfer mode to the asynchronous command mode. As is explained below, the present invention also permits a true-to-false transition of the DTR signal to instruct the modem to enter the "dumb" asynchronous mode.

A modem generally detects a change in the DTR signal by periodically sampling it. However, if electrical noise or a static discharge has caused the microprocessor to lock up then the modem will not be able to sample the DTR signal and will stay locked up. The preferred embodiment uses electronic hardware external to processor 36 to detect the true-to-false change in the DTR signal and reset microprocessor 36. This allows the user to regain control of the modem.

The data terminal ready (DTR) signal conductor 14 of RS-232C bus 11, is connected to one terminal of a capacitor 15 and to the input of an inverting line receiver 20. The response control of line receiver 20 is connected to one terminal of a capacitor 17 by line 18. The other terminals of capacitors 15 and 17 are connected by conductor 16 to the system ground. Capacitor 15 is a high frequency noise suppressor and capacitor 17 shapes the response of line receiver 20. Line receiver 20 converts the DTR signal on conductor 14 from RS-232C levels to, in the preferred embodiment, CMOS logic voltage levels.

The output of line receiver 20 is a negated DTR signal and is connected by conductor 21 to the input of inverter 22 and to the trigger input of a positive-edge-triggered, non-retriggerable one-shot 24. The output of inverter 22 is the DTR signal and is connected to the P31 input of processor 36 by conductor 23. Processor can therefore detect the false-to-true transition of the DTR signal by periodically sampling the DTR signal on conductor 23.

One-shot 24 has a period of approximately 2.3 milliseconds. This period is not critical but, as will be discussed below, must be long enough to allow comparator 31 to discharge capacitor 34 and cause a reset of procesor 36. Methods of construction of one-shot 24 are well known.

A true-to-false transition of the DTR signal on conductor 14 will be a false-to-true signal on conductor 21, thereby triggering one-shot 24. The Q output of one-shot 24 is connected by conductor 25 to one input of a two-input AND-gate 26. The other input of AND-gate 26 is connected by conductor 27 to one terminal of a pullup resistor 28 and to the P27 output of processor 36. The other terminal of pullup resistor 28 is connected to a logical 1 by conductor 29.

If the user has programmed the modem 12 to ignore the DTR signal then processor 36 will place a logical 0 onto conductor 27, thereby disabling AND-gate 26 and preventing the output of one-shot 24 from causing a reset of processor 36. Conversely, if the user has programmed the modem 12 to be responsive to the DTR signal then processor 36 will place a logical 1 on conductor 27, thereby enabling AND-gate 26 and allowing a reset to occur.

The output of AND-gate 26 is connected by conductor 30 to the inverting input of open collector comparator 31. The non-inverting input of comparator 31 is connected by conductor 32 to a first voltage reference, VR1. Voltage VR1 is such that a logical 1 on conductor 30 causes the output of comparator 31 to be a logical 0, and a logical 0 on conductor 30 causes the output of comparator 31 to be an open circuit. In the preferred embodiment, the logical 1 voltage is five volts and VR1 is approximately 2.1 volts.

The output of comparator 31 is connected by conductor 33 to the other modem circuits 13, the output of comparator 44, one terminal of a capacitor 34, and the negated reset input of processor 36. The other terminal of capacitor 34 is connected to ground by conductor 35.

If the DTR signal on conductor 14 changes from a true to a false, the negated DTR signal on conductor 21 will change from a logical 0 to a logical 1, triggering one-shot 24, and causing its Q output to become a logical 1 for approximately 2.3 milliseconds. If the user has programmed the modem 12 to be responsive to DTR commands, then the P27 output of processor 36 on conductor 27 will be a logical 1, which enables AND-gate 26. Since the Q output of one-shot 24 is a logical 1, the output of AND-gate 26 will be a logical one, and the output of comparator 31 on conductor 33 will be a logical 0, thereby discharging capacitor 34, and resetting processor 36. Approximately 2.3 milliseconds later the Q output of one-shot 24 will revert to a logical 0, thereby causing the output of comparator 31 to become an open circuit.

Processor 36 has an internal 100 kilohm resistor 37 connected between the negated reset input and the supply voltage V5. Therefore, once the output of comparator 31 has become an open circuit capacitor 34 will begin charging through internal resistor 37. When the voltage across capacitor C34 has risen to approximately 3.1 volts, the reset of processor 36 will end. In the preferred embodiment capacitor 34 is 3.3 microfarads. This value is not critical but must, together with the internal resistance at the RESET input, provide a time constant which is long enough to allow processor 36 and the other modem circuits 13 to reset, and short enough that the modem 12 is not disabled for an excessive period. In the preferred embodiment, a true-to-false change in the DTR signal on conductor 14 will cause processor 36 to be held in a reset condition for approximately 0.3 seconds.

It will be appreciated that an open collector comparator such as comparator 31 cannot instantaneously discharge a large capacitor such as capacitor 34. It will therefore be understood that the 2.3 millisecond period of one-shot 24 was chosen to allow the output of comparator 31 to remain in a conducting (logical 0) state for a sufficient time to discharge capacitor 34.

Upon termination of the reset period, processor 36 reads the configuration settings in memory 90 and tests for the presence of jumper 61 on plug 60 to determine what operating state the modem 12 should be placed in. From the above discussion it will be seen that the user may program the modem 12 so that a true-to-false transition fo the DTR signal on conductor 14 is detected without using processor 36 to monitor the status of the DTR signal.

Processor 36 is of a type which requires its initialization routine to reside within the first 256 bytes of executable code. This 256 bytes of code contains instructions for configuring the processor 36. It also contains instructions which read and test the memory device 90, read the factory default configuration profile in the read only memory in the other modem circuits 13 if the memory device 90 is defective or missing, read the location of the jumper 61, and perform any other instructions necessary to complete the initialization of the modem 12.

As previously stated, the negated reset input of processor 36 and one terminal of capacitor 34 are also connected to the output of open collector comparator 44 by conductor 33. The inverting input of comparator 44 is connected by conductor 42 to one terminal of capacitor 41 and one terminal of resistor 43. The other terminal of capacitor 41 is connected to the supply voltage V5 by conductor 40. The other terminal of resistor 43 is connected to ground by conductor 46. The non-inverting input of comparator 44 is connected to a second voltage reference VR2 by conductor 45.

It will be appreciated that capacitor 41 couples time-varying voltages from the power supply voltage V5 to the inverting input of comparator 44. If supply voltage V5 is a steady D.C. voltage the voltage on the inverting input of comparator 44 will be zero. This is below the level of reference voltage VR2 so that output of comparator 44 will be an open circuit.

However, power supply noise, ripple, and the power-on-transient voltages will be coupled by capacitor 41 onto conductor 42. If these voltages exceed voltage VR2 then the output of comparator 44 will be a logical 0, thereby discharging capacitor 34 and resetting processor 36. In the preferred embodiment, reference voltage VR2 is 0.2 volts. This voltage is not critical but should be large enough to prevent inconsequential noise and ripple from resetting processor 36, and small enough to cause processor 36 to be reset when power is on and significant noise or ripple is present which would cause the modem 12 to operate in an unreliable or erroneous manner.

From the above discussion it will be understood that processor 36 and the other modem circuits 13 are automatically reset, without use invention, when power is first turned on, and also whenever the noise and ripple on the power supply is significant enough to adversely affect the reliability of operation of the modem.

It will also be understood that, since comparators 31 and 44 are in parallel, the outputs of both comparators must be an open circuit to allow processor 36 to change from the reset condition to an operating condition.

Data terminal 10 is connected to the other modem circuits 13 by an RS-232C interface cable 11. The other modem circuits 13 are connected to processor 36 by a multiconductor bus 114, conductor 92, conductors 67, 70, 71, and, through the multiplexer 56, by conductor 63. One skilled in the art will realize that the user will typically use an asynchronous data terminal 10 to send the configuration parameters to the modem 12 over the RS-232C interface 11. It will also be realized that these configuration parameters are initially stored in the internal registers of processor 36.

Processor 36 is also connected to a memory device 90. In the preferred embodiment the memory device 90 is an X2444, manufactured by Xicor, of Milpitas, Calif. The X2444 is a serial input-serial output memory device which has a 16 bit-by-16 bit nonvolatile electrically alterable read only memory (EAROM) overlaid onto a 16 bit-by-16 bit volatile random access memory (RAM).

The memory device 90 serves as a non-volatile RAM and is therefore referred to as a NOVRAM. It operates as follows. The NOVRAM 90 has, excluding the power supply and ground terminals, five input terminals and one output terminal. The chip enable (CE) input (line 95) is held at a logical 1 when sending instructions or data to, or receiving information from, the NOVRAM 90. Instructions to, and any data to be stored in, the NOVRAM 90 are provided, in serial format, to the data input (DI) terminal (line 92). Data from the NOVRAM 90 is provided, in serial format, on the data output (DO) terminal (line 94). Instructions and/or data are clocked into/out of the NOVRAM 90 by the shift clock (S) terminal connected to line 93.

The NOVRAM 90 has a seven-word instruction set. The six instructions of primary interest for the preferred embodiment write data into and read data out of a particular RAM address, set and clear the EAROM write enable latch, transfer (store) the RAM data into the EAROM, and transfer (recall) the EAROM data into the RAM. A logical 0 on the negated recall (RE) input terminal (line 97) will also cause the data in the EAROM to be transferred into the RAM. Furthermore, if the EAROM write enable latch has been set, a logical 0 on the negated store (ST) input terminal (line 103) will cause the data in the RAM to be transferred into the EAROM. Additional details on NOVRAMs such as the X2444 are available in literature available from the manufacturers of such devices and are known to those skilled in the art.

Processor 36 is connected to the NOVRAM 90 as follows. The P35 output of processor 36 is connected to the chip enable input of NOVRAM 90 by a conductor 95. The processor 36 places a logical 1 onto the conductor 95 when processor 36 is sending instructions or data to, or receiving data from, the NOVRAM 90 and places a logical 0 onto the conductor 95 otherwise.

The P07 output of processor 36 is connected to the data input of NOVRAM 90 by conductor 92. The processor 36 provides instructions and data, i.e.— operating parameters, to the NOVRAM 90 over conductor 92. Processor 36 is also connected to the other modem circuits 13 by conductor 92 and can communicate with the other modem circuits 13 over conductor 92 when the chip enable conductor 95 is in a logical 0 state.

The P24 input of the processor 36 is connected to the data output terminal of the NOVRAM by a conductor 94. Data, i.e.—operating parameters, stored in the NOVRAM 90 are transferred to the processor 36 over the conductor 94.

The P36 output of processor 36 is connected to the shift clock input of NOVRAM 90 by conductor 93. The shift clock frequency must be 1.0 MHz or less for the Xicor X2444.

In the preferred embodiment the VCC terminal of the NOVRAM 90 is connected by a conductor 82 to a five-volt power supply filter and regulator 80. The remainder of the circuits in the modem 12 are connected to another five-volt power supply filter and regulator 75, the output of which appears on conductor 77. The discharge time constant of the power supply 80 is approximately 10 milliseconds greater than the discharge time constant of the power supply 75. The charging time constant of the power supply 80 is less than or equal to the charging time constant of the power supply 75.

The negated recall input (RE) of the NOVRAM 90 is connected by a conductor 97 to one end of a capacitor 100 and to one end of a resistor 102. The other end of resistor 102 is connected by conductor 82 to the output of the power supply 80. The other end of the capacitor 100 is connected to ground by a conductor 101. Resistor 102 and capacitor 100 are selected to provide a time constant of approximately thirty microseconds. When A.C. power is first applied to the modem 12, the negated recall input of the NOVRAM 90 will be held low for a brief period after power has been applied to the NOVRAM 90. The logical 0 on the negated recall input instructs the NOVRAM 90 to transfer the information contained in the EAROM into the RAM. Therefore, when the A.C. power is first applied, the configuration profile which the user had previously stored is now recalled into the RAM of the NOVRAM 90. It will be appreciated that the processor 36 can then copy into its internal registers the configuration profile now stored in the NOVRAM's volatile RAM.

One skilled in the art will appreciate that the end of resistor 102 connected to the output of power supply 80 can, instead, be connected to the output of power supply 75 if power supply 75 charges at the same rate or a slower rate than power supply 80.

When a NOVRAM 90 is manufactured, the manufacturer will typically, as part of the testing process, load at least the first register of the EAROM with alternating 1's and 0's. However, as is explained below, if the processor 36 has previously stored a user-selected configuration into the EAROM, it will also have loaded the first register of the EAROM with a predetermined bit pattern which is different than the alternating 1's and 0's bit pattern.

In the preferred embodiment, after a reset of the processor 36 has been completed, the processor 36 will read the contents of the first register of the RAM section of NOVRAM 90.

If the first register of the RAM of the NOVRAM 90 contains the predetermined bit pattern then the processor 36 will copy into its internal registers the contents of the remaining RAM registers, which is the user-programmed configuration profile, and use this profile as the active configuration profile. However, if the first register of the RAM does not contain the predetermined bit pattern, the processor 36 will then load the factory set default configuration profile from the ROM in the other modem circuits 13 into its internal registers, and use this profile as the active configuration profile.

The processor 36 will therefore initially use, as the active configuration profile, the user-programmed configuration profile in the EAROM if the contents of the first RAM register are the predetermined bit pattern and, otherwise, the processor 36 will use the factory set default configuration profile in the ROM.

It will be appreciated that testing the first register of the RAM of the NOVRAM 90 also allows the processor 36 to detect a defective or missing NOVRAM 90. Under those circumstances, processor 6 also selects the factory set default configuration profile.

It will be appreciated that the user can use an asynchronous data terminal 10 to select the active configuration profile from the factory set default configuration profile, the user-programmed configuration profile stored in the EAROM of the NOVRAM 90, or may generate a new active configuration profile.

The outputs of the step-down transformer 51 are connected to the inputs of the AC power detector 54 by conductors 52 and 53. The Q output of AC power detector 54 is a logical 1 when AC power is present, and a logical 0 when the AC power is removed or fails. Methods of constructing an AC power detector 54 are well known. The Q output of the AC power detector 54 is connected by a conductor 55 to the X6 input of an 8-to-1 multiplexer 56. The X output of the multiplexer 56 is connected by a conductor 64 to the P20 input of the processor 36 and to the V5 output of the power supply 75 by a resistor 65 and a conductor 66.

Assume that the user, using the data terminal 10, commands the processor 36 to copy the active configuration profile in its internal registers into the NOVRAM 90. Processor 36 will place a logical 1 on the chip enable conductor 95, place a clock signal on the shift clock conductor 93, and send a command, in serial data format, over the data input conductor 92, which instructs the NOVRAM 90 to store the next 16 bits of data in a designated register in the RAM of the NOVRAM 90. Processor 36 repeats this sequence until the complete configuration profile has been stored in the 16 registers in the RAM of the NOVRAM 90. Processor 36 will also cause the above referenced predetermined bit pattern to be loaded into the first register of the RAM.

Processor 36 then, through multiplexer 56, tests the Q output of the AC power detector 54. If the Q output is a logical 1, the processor 36, in the manner described above, sends a command to the NOVRAM 90 to set the write enable latch, and then a command to copy the contents of the RAM into the EAROM. The user has thereby caused a new configuration profile to be stored in the EAROM. Also, the predetermined bit pattern is now stored in the first register of the EAROM.

If, however the Q output of AC power detector 54 is a logical 0, indicating that the AC power has failed, the processor 36 sends to the NOVRAM 90 only a command to set the write enable latch. The negated store input of the NOVRAM 90 is connected to the output V5 of the power supply 75 through a resistor 104 and a conductor 105. Therefore, as the output V5 of power supply 75 falls, the negated store input of the NOVRAM 90 will become a logical 0. Since the processor 36 has set the write enable latch of the NOVRAM 90, a logical 0 on the negated store input instructs the NOVRAM 90 to copy the contents of the RAM into the EAROM. Therefore, the user-programmed configuration profile and the predetermined bit pattern will be saved in the EAROM of the NOVRAM 90 even if a power failure occurs.

It will be appreciated that the instructions which direct processor 36 to perform these functions are contained in the read only memory (ROM) of the other modem circuits 13.

NOVRAM 90 requires ten milliseconds to copy the contents of the RAM into the EAROM. Therefore, as previously stated, the NOVRAM 90 has a separate power supply 80 which has a discharge time constant which is at least ten milliseconds greater than the time constant of the power supply 75. This arrangement therefore provides the NOVRAM 90 with the necessary operating power for an additional ten milliseconds after the output of the main power supply 75 falls and the negated store signal on conductor 103 has become a logical 0.

Alternate embodiments of the present invention may be constructed so that in the event to an AC power failure, the modem 12 retains the configuration profile in use at the time of the power failure. In such embodiments the ROM in circuits 13 is programmed so that the processor 36 periodically samples the Q output of the AC power detector 54. If the processor 36 detects a logical 0 on the Q output of the AC power detector 54, then processor 36 sets the write enable latch of the NOVRAM. This causes the contents of the RAM section of memory 90 to be transferred to the EAROM when line 103 goes low.

From the foregoing it will be appreciated that the following timing constraints are used in the embodiments described above. In the event of a power failure, the output of AC power detector 54 goes low first. The outputs of power supply regulators 75 and 80 also begin to drop. Processor 36 is programmed so that its polling of the inputs to multiplexer 56 is at a sufficient rate so that detection of a logical 0 output from power detector 54 and execution of the program steps necessary to write a command to NOVRAM 90 setting the write enable latch will occur before the output of main power supply 75 falls to a point at which the processor 36 will no longer operate.

Once this is accomplished, NOVRAM 90 no longer cares if the main power supply has discharged to a point at which it can no longer operate processor 36. The discharge time constant of regulator 80 is longer than the corresponding discharge time constant of main supply regulator 75 by a period at least equal to the time required by NOVRAM 90 to make its RAM-to-EAROM transfer in response to an active store (ST) input signal.

Therefore, in the second embodiment described above, the time constraints are such that the configuration profile in use at the time of power failure is always stored in the EAROM section of NOVRAM 90, allowing it to be recalled when power is restored. In the preferred embodiment, the constraints make sure that once a configuration profile has been stored in the NOVRAM RAM section in response to a user command, it will dependably be transferred to the EAROM section even if a power failure occurs just after processor 36 writes data to the RAM section.

Some users, after first programming the desired configuration profile into the EAROM of the NOVRAM 90, with an asynchronous data terminal 10, will use the modem 12 exclusively with a designated data terminal 10 and will have little or no need to later change the user-programmed configuration profile. In such a case, or in a case where the user is not concerned if the modem 12 fails to store the new configuration profile if the AC power fails, then the AC power detector 54 may be omitted. In this case, the negated store pullup resistor 104 would be connected to the output of the NOVRAM 90 power supply 80 instead of to the V5 output of the power supply 75.

If the modem 12 is constructed in this modified manner, the negated store input of the NOVRAM 90 will fall with the output of the power supply 80 so a store operation will not be effected. The NOVRAM 90 will effect a store operation only if the processor 36 issues to the NOVRAM 90 both a command to set the write enable latch of the NOVRAM 90 and a store command.

An alternate embodiment of the present invention uses only an electrically alterable read only memory (EAROM) for the memory 90. In this case, the memory 90 is preferably embodied in the form of the NMC9346/COP495 memory, manufactured by National Semiconductor Corporation of Santa Clara, Calif. The NMC9346/COP495 has only an EAROM, and no RAM. An implementation of the present invention using the NMC9346/COP495 would be as shown in the FIGURE except that conductors 97, 101, 103 and 105, resistors 102 and 104, and capacitor 100 are deleted. Since their only purpose is to enable RAM-to-EAROM and EAROM-to-RAM data transfers, and since the NMC9346/COP495 does not have a RAM, these components are not required in the alternate embodiment.

Also, the maximum frequency of the shift clock signal (SK) is 250 kHz. The principles of operation of the NMC9346/COP495 are the same as for the Xicor X2444. Details on the NMC9346/COP495 are supplied in literature available from the manufacturer.

If the alternate embodiment is used and it is desired that the current configuration profile be automatically stored if a power failure occurs, then power supply 75 must have sufficient storage capacity to permit the processor 36 to store the complete configuration profile into the memory 90 before the output of power supply 75 drops to a point where the processor 36 fails to function reliably. Furthermore, the power supply 80 must maintain the proper operating voltage for the memory 90 for at least 10 milliseconds after the last store command.

The X7 input of multiplexer 56 is connected by conductor 57 to the number 2 pin of a connector 60. The number 1 pin of connector 60 is connected to ground by conductor 62. The number 3 pin of connector 60 is an open circuit. Jumper wire 61 can be used to connect together either pins 1 and 2 of connector 60, or pins 2 and 3 of connector 60. During the initialization period after the termination of a reset signal on conductor 33, processor 36 samples the position of jumper wire 61 by commanding multiplexer 56 to connect its X7 input (conductor 57) to its X output (conductor 64).

If jumper wire 61 connects pins 1 and 2 of connector 60, conductor 57 will be connected to ground and the X output of multiplexer 56 will be a logical 0, which commands processor 36 to operate the modem 12 in the "dumb" mode. When the modem 12 is in the dumb mode it operates as a data transfer device and is unresponsive to commands from data terminal 10, with the selectable exception of responding in a preprogrammed manner to changes in the DTR signal on conductor 14. When the modem 12 is in the dumb mode the active configuration parameters are the configuration parameters preprogrammed into the NOVRAM 90 and cannot be changed. It will be understood that the configuration parameters and the response to the DTR signal on conductor 14 must have been programmed using a data terminal 10 before the modem 12 was placed in the dumb mode.

If jumper wire 61 does not connect pins 1 and 2 of connector 60, when processor 36 commands multiplexer 56 to connect its X7 input to its X output, conductor 57 will see an open circuit and pullup resistor 65 will pull conductor 57 and 64 to a logic 1. This commands processor 6 to operate modem 12 in its intelligent mode.

When the modem 12 is in the intelligent mode and is also in the asynchronous state, processor 36 responds to commands from data terminal 10, thereby allowing the user to change the configuration parameters.

It will be appreciated that the use of a connector 60 and a jumper wire 61 inside a modem 12 has several advantages. Assume, for example, that a software command from data terminal were to be used to command a modem to operate in the dumb mode. Once the command is given, the modem cannot be commanded to operate in the intelligent mode because, once in the dumb mode, the modem ignores all programming commands from the data terminal. The modem would therefore be permanently locked into the dumb mode.

Of course, a switch could be used to select dumb/smart operation. However, in a commercial use environment where the modem 12 is just programmed with an asynchronous data terminal and thereafter used only with a synchronous data terminal, an operator may inadvertently or misguidedly change the switch setting from dumb mode to smart mode. A later data transfer could then erroneously be interpreted as a command to change the configuration. This would render the modem useless until the configuration parameters were reprogrammed, causing lost time and possibly lost data.

An internal switch would reduce but not entirely eliminate the above problem. Furthermore, switches are susceptible to contact corrosion from atmospheric elements, thereby creating the possibility that contact corrosion could create an open circuit, thereby causing the modem to unexpectedly enter its intelligent mode, with the consequences described above. The use of a connecter 60 and a jumper wire 61 therefore avoids these problems.

From the foregoing it will be appreciated that the present invention provides significant improvements and advantages over prior modems. The present invention provides for the automatic storage and recall of a complete user-programmed configuration profile in a nonvolatile memory, for the automatic testing of the nonvolatile memory, and for automatically switching to a factory set default configuration profile in the event that the nonvolatile memory is missing, defective, or has not been programmed with a configuration profile. The present invention also automatically resets the modem to a known operating state if disruptive transients appear on the power supply or if a negative transition of the DTR signal occurs. The present invention also provides a simple, effective method of placing the modem into a dumb operating mode so that a defective data terminal cannot affect the user-programmed active configuration profile.

While this invention has been described in detail with particular reference to the preferred embodiment thereof, it will be appreciated that, because of the teachings contained herein, numerous variations and modifications within the spirit and scope of the present invention may suggest themselves to those skilled in the art. Accordingly, this invention is to be limited only by the claims below.

We claim:

1. A configuration profile storage apparatus for a modem providing for the automatic, permanent storage of a complete set of user-selected modem operating parameters in the event of electrical power interruption, comprising in combination:

first power supply means having a first discharge time constant for providing operating voltage and current to said modem;

first power failure detector means for providing a first output signal in the event that electrical power to said first power supply is interrupted;

second power failure detector means responsive to said operating voltage of said first power supply means for providing a second output signal;

control means responsive to a first user command for providing a first and a second set of digital words and responsive to said first output signal for providing a first predetermined digital word, said first set of digital words comprising write-related instructions, said second set of digital words comprising operating parameters, and said first predetermined digital word comprising a first predetermined instruction;

second power supply means having a second discharge time cosntant, said second discharge time constant being greater than said first discharge time constant by a first predetermined period of time; and storage means powered by said second power supply means and comprising a volatile memory section responsive to said first set and said second set of digital words for storing said operating parameters, and a nonvolatile memory section responsive to said first predetermined digital word and to said second output signal for copying the contents of said volatile memory section into said nonvolatile memory section.

2. The apparatus of claim 1 wherein said control means comprises a microprocessor.

3. The apparatus of claim 1 wherein said second power failure detector means comprises a resistor.

4. The apparatus of claim 1 wherein said nonvolatile memory section comprises an electrically alterable read only memory and each bit of said nonvolatile memory section of said storage means is overlaid onto a corresponding bit of said volatile memory section of said storage means, said volatile memory section comprising a random access memory.

5. The apparatus of claim 1 wherein said first predetermined period of time is at least the amount of time needed by said storage means to transfer the contents of said volatile memory section into said nonvolatile memory section.

6. The apparatus of claim 1 also providing for the user-initiated permanent storage of a complete set of user-selected configuration parameters wherein:

said control means is also responsive to a second user command for providing a second predetermined digital word, said second predetermined digital word corresponding to a second predetermined instruction to permanently store said operating parameters; and said storage means in also responsive to said second predetermined digital word for copying said contents of said volatile memory section into said nonvolatile memory section.

7. The apparatus of claim 1 also providing for the automatic storage of a second predetermined digital word in a predetermined part of said nonvolatile memory section of said storage means when said contents of said volatile memory section are copied into said nonvolatile memory section of said storage means for providing an indication that said user has previously programmed said storage means and wherein:

said first set of digital words also comprises the write-related instructions necessary to cause said storage means to store said second predetermined digital word in a predetermined part of said volatile memory section, and said second set of digital words also comprises said second predetermined digital word.

8. A configuration profile storage apparatus for a modem providing for the automatic recall of a complete set of user-selected, permanently stored operating parameters upon the application of electrical power to said modem, comprising in combination:

first power supply means having a first charge time constant for providing operating voltage and current to said modem;

first power-up detection means for providing a first output signal responsive to said operating voltage provided by said first power supply means;

control means responsive to said first output signal for providing a first set of digital words and accepting a second set of digital words, said first set of digital words corresponding to read-related instructions and said second set of digital words corresponding to configuration parameters;

second power supply means having a second charge time constant for providing operating voltage and current to a memory means, said second charge time constant being less than or equal to said first charge time constant;

second power-up detection means for providing a second output signal responsive to said operating voltage provided by either said first power supply means or, in the alternative, said second power supply means; and memory means, powered by said second power supply means, comprising a nonvolatile memory section, in which said operating parameters are permanently stored, and a volatile memory section, and responsive to said second output signal for copying the contents of said nonvolatile memory section into said volatile memory section, and responsive to said first set of digital words for providing said second set of digital words.

9. The apparatus of claim 8 wherein said second power supply means and said first power supply means each include a common rectifier.

10. The apparatus of claim 8 wherein said second output signal is electrically identical to said first output signal.

11. The apparatus of claim 8 wherein said control means comprises a microprocessor.

12. The apparatus of claim 8 wherein said second power up detection means comprises a resistor and a capacitor.

13. The apparatus of claim 8 wherein said nonvolatile memory section comprises an electrically alterable read only memory and each bit of said nonvolatile memory section of said storage means is overlaid onto a corresponding bit of said volatile memory section of said storage means, said volatile memory section comprising a random access memory.

14. The apparatus of claim 8 also providing for the user-initiated recall of a complete set of user-selected, permanently stored operating parameters wherein:

said control means is also responsive to a user command for providing a first predetermined digital word, said first predetermined digital word corresponding to an instruction to recall said permanently stored operating parameters; and said storage means is also responsive to said first predetermined digital word for copying said contents of said nonvolatile memory section into said volatile memory section.

15. The apparatus of claim 8 also providing for the automatic testing of said storage means and the automatic recall of a complete set of default operating parameters in the event that said storage means is defective, missing, or not previously programmed by said user, and further comprising:

read only memory means containing a complete set of default operating parameters and a second predetermined digital word;

and wherein said storage means also contains said second predetermined digital word in a predetermined part of said nonvolatile memory section if said storage means has been previously programmed by said user;

and wherein said control means causes and is responsive to a comparison of the contents of said predetermined part of said nonvolatile memory section of said storage means with said second predetermined digital word stored in said read only memory means for providing for the selection of said operating parameters in said storage means if said comparison is affirmative and, otherwise, for providing for the selection of said default operating parameters in said read only memory means.

16. Initialization apparatus providing for the automatic forcing of a modem into a predetermined operating state in the event of excessive transients on the output voltage of the power supply of said modem, comprising in combination:

power supply means for providing operating voltage and current to said modem;

high pass filter means connected to said power supply means for providing a filtered transient output signal;

comparator means responsive to said filtered transient output signal and to a first predetermined reference voltage for providing a reset pulse of a predetermined minimum duration; and control means for controlling the operation of said modem and responsive to said reset pulse for forcing said control means and said modem into said predetermined operating state independent of the present operating state of said control means and said modem.

17. In a modem of the type which can be selectively placed in an intelligent mode of operation wherein said modem is responsive to predetermined command signals provided at an input port and alternately placed in a dumb mode of operation wherein said modem functions as a data transfer device nonresponsive to said predetermined command signals as operational commands; an apparatus, for selectively placing said modem in said dumb mode, comprising in combination:

a connecting means selectively connecting a first conductor to either a second conductor or a third conductor, said second conductor being at a first predetermined voltage and said third conductor being at a second predetermined voltage;

control means connected to said first conductor and responsive to the voltage on said first conductor for rendering said control means and said modem responsive to said commands when said voltage is said first predetermined voltage and rendering said control means and said modem nonresponsive to said commands when said voltage is said second predetermined voltage; and said connecting means and said first, second and third conductors are inside the cabinet of said modem so that said connecting means and said conductors cannot be accessed without removing said cabinet.

18. Apparatus as in claim 17 wherein one of said first or second predetermined voltages corresponds to a logic 0 and the other of said predetermined voltages corresponds to a logic 1.

19. Apparatus as in claim 17 wherein said control means is responsive to an open circuit connected to said first conductor in the same manner as when said first conductor is connected to said second conductor.

20. Apparatus as in claim 17 wherein said connecting means comprises a jumper strap.

21. Apparatus as in claim 17 wherein said connecting means comprises a switch.

22. Apparatus as in claim 17 wherein said control means is responsive to said voltage on said first conductor for a first predetermined period of time after the occurrence of a reset pulse, and further comprising:

reset pulse generator means responsive to the application of operating power to said modem for providing said reset pulse for a second predetermined period of time after said application.

23. Apparatus as in claim 17 wherein said control means is responsive to said voltage on said first conductor for a first predetermined period of time after the occurrence of a reset pulse, and further comprising:

reset pulse generator means selectively responsive to a predetermined input signal for providing said reset pulse for a second predetermined period of time after a predetermined transition of said predetermined input signal.

24. Apparatus as in claim 17 wherein said control means comprises a microprocessor.

25. In an intelligent modem of the type characterized by a controller including a microprocessor, a selectively alterable configuration profile, wherein said configuration profile is represented by a plurality of digital configuration signals stored in an addressable first memory device and said controller causes said modem to operate in a mode determined by said digital configuration signals, a power supply regulator for providing operating power to said microprocessor and having a characteristic discharge time constant defining a first predetermined time period between loss of input power to said regulator and a predetermined output condition of said regulator in which said regulator can no longer supply adequate operating power to said microprocessor; an improvement to said controller comprising in combination:

a nonvolatile second memory device;

power failure detection means connected to an input of said regulator for providing a power down signal in response to detection of a predetermined condition at said input;

data selector means interposed between said microprocessor and said power failure detection means for allowing said microprocessor to poll said power failure detection means at least once within each occurrence of a third predetermined period of time to test for the presence of said power down signal:

wherein said controller includes control means for transferring said digital configuration signals from said first memory device to said second memory device in response to said power down signal within a second predetermined time period, said second predetermined time period being less than said first predetermined time period;

and wherein said first predetermined time period is at least as long as the sum of said second and third predetermined time periods.

26. In an intelligent modem of the type characterized by a controller including a microprocessor, a selectively alterable configuration profile, wherein said configuration profile is represented by a plurality of digital configuration signals stored in an addressable first memory device and said controller causes said modem to operate in a mode determined by said digital configuration signals, a power supply regulator for providing operating power to said microprocessor and having a characteristic discharge time constant defining a first predetermined time period between loss of input power to said regulator and a predetermined output condition of said regulator in which said regulator can no longer supply adequate operating power to said microprocessor; an improvement to said controller comprising in combination:

a nonvolatile second memory device;

power failure detection means connected to an input of said regulator for providing a power down signal in response to detection of a predetermined condition at said input;

wherein said controller includes control means for transferring said digital configuration signals from said first memory device to said second memory device in response to said power down signal within a second predetermined time period, said second predetermined time period being less than said first predetermined time period; and     wherein said controller is responsive to each occurrence of a power up condition of said modem, wherein input power is applied to said power supply regulator after said modem has been off, to load said digital configuration signals from said nonvolatile second memory device into said first memory device.

27. The improvement of claim 26 wherein said controller further comprises a nonvolatile third memory device containing a default set of said digital configuration signals defining a default configuration profile, and said control means is responsive to each said occurrence of said power up condition to read a predetermined location in said second memory device to test for the presence of a predetermined digital word, and is alternatively responsive to said presence of said predetermined digital word to load said digital configuration signals from said second memory device into said first memory device, and responsive to the absence of said predetermined digital word to load said default set of digital configuration signals from said third memory device into said first memory device.

28. In an intelligent modem of the type characterized by a selectively alterable configuration profile, wherein said configuration profile is represented by a plurality of digital configuration signals stored in an addressable first memory device, a first power supply regulator having a characteristic first discharge time constant defining a first predetermined time period between loss of input power to said first regulator and a predetermined output condition of said regulator in which said first regulator can no longer supply a predetermined adequate output power, and a controller, said controller being powered by an output of said first power supply regulator and being connected to said first memory device to operate in a mode detetermined by said digital configuration signals, an improvement to said controller comprising in combination:

a nonvolatile random access memory (NOVRAM) connected to said controller comprising a volatile second memory device and a nonvolatile third memory device of the type requiring a predetermined write enable instruction to enable transfer of data from said second memory device to said third memory device in response to a store signal provided to said NOVRAM, said transfer of data requiring a characteristic second predetermined period of time;

a second power supply regulator for providing operating power to said NOVRAM and having a characteristic second discharge time constant defining a third predetermined time period between loss of input power to said second regulator and a predetermined output condition of said second regulator in which said second regulator can no longer supply a predetermined adequate output power, said third predetermined time period exceeding said first predetermined time period by a predetermined time difference at least as long as said second predetermined period of time;

power failure detection means connected to an input of said first regulator for providing a power down signal in response to detection of a predetermined condition at said input;

wherein said controller includes control means for transferring said digital configuration signals from said first memory device to said second memory device and providing said write enable instruction to said NOVRAM in response to said power down signal and for providing said store signal in response to said output of said first regulator dropping to a predetermined value.

* * * * *